United States Patent
Smith et al.

(10) Patent No.: US 6,757,761 B1
(45) Date of Patent: Jun. 29, 2004

(54) MULTI-PROCESSOR ARCHITECTURE FOR PARALLEL SIGNAL AND IMAGE PROCESSING

(75) Inventors: Winthrop W. Smith, Richardson, TX (US); James R. Bartlett, Plano, TX (US); Jay T. Labhart, Allen, TX (US)

(73) Assignee: Tera Force Technology Corp., Richardson, TX (US)

( * ) Notice: Subject to any disclaimer, the term of this patent is extended or adjusted under 35 U.S.C. 154(b) by 482 days.

(21) Appl. No.: 09/850,939

(22) Filed: May 8, 2001

(51) Int. Cl.$^7$ .................... G06F 13/00; G06F 15/167; G06F 12/00
(52) U.S. Cl. .................... 710/100; 709/215; 711/150
(58) Field of Search .................... 710/100, 305; 709/215

(56) References Cited

U.S. PATENT DOCUMENTS

| | | | | |
|---|---|---|---|---|
| 3,473,160 A | * | 10/1969 | Wahlstrom | 326/41 |
| 4,060,713 A | * | 11/1977 | Golay | 382/205 |
| 4,174,514 A | * | 11/1979 | Sternberg | 282/303 |
| 4,509,187 A | * | 4/1985 | Ackland et al. | 704/241 |
| 5,146,608 A | * | 9/1992 | Hillis | 712/22 |
| 5,635,851 A | * | 6/1997 | Tavana | 326/27 |
| 5,887,138 A | * | 3/1999 | Hagersten et al. | 709/215 |
| 6,226,738 B1 | * | 5/2001 | Dowling | 712/225 |
| 6,504,786 B1 | * | 1/2003 | Kavipurapu | 365/230.05 |

OTHER PUBLICATIONS

Block diagram of Thales' VxG4 board, downloaded on Apr. 25, 2001 from <http://www.cetia.com/images/prod_bds_vxg4_blockdiag.jpg>.
"SKY Computers Announces SKYbolt II 9U Multiprocessor with Enhanced Interconnect and Fast Boot Capabilities", Sky Computers, Inc., downloaded on Apr. 25, 2001 from: http://www.skycomputers.com/news/E9U.html.

* cited by examiner

*Primary Examiner*—Tim Vo
(74) *Attorney, Agent, or Firm*—Robert H. Frantz (57) ABSTRACT

A quad-processor arrangement having 6 communications paths, one path between each of every possible pair of processors. Each processor is provided with a local memory which can be accessed by the local processor as well as by the other processors via the communications paths. This allows for efficient data movement from one processor's local memory to another processor's local memory, such as commonly done during signal processing corner turning operations. The communications paths are controlled and interfaced to the processors through field programmable logic, which allows the board to be configured both statically and dynamically to optimize the data transfer characteristics of the module to match the requirements of the application software. The programmable logic may be configured so that the module emulates other existing board architectures in order to support legacy applications.

11 Claims, 4 Drawing Sheets

Figure 1

*Prior Art*

MULTI-PROCESSOR ARCHITECTURE FOR PARALLEL SIGNAL AND IMAGE PROCESSING

TECHNICAL FIELD OF THE INVENTION

This invention relates to the fields of multi-processor architectures and arrangements suitable for distributed and parallel processing of data such as signal and image processing.

CROSS-REFERENCE TO RELATED APPLICATIONS

Not applicable.

FEDERALLY SPONSORED RESEARCH AND DEVELOPMENT STATEMENT

This invention was not developed in conjunction with any Federally sponsored contract.

BACKGROUND OF THE INVENTION

There are many applications of image and signal processing which require more microprocessing bandwidth than is available in a single processor at any given time. As microprocessors are improved and their operating speeds increase, so too are the application demands continuing to meet or exceed the ability of a single processor. For example, there are certain size, weight and power requirements to be met by processor modules or cards which are deployed in military, medical and commercial end-use applications, such as a line replaceable unit (LRU) for use in a signal processing system onboard a military aircraft. These requirements typically limit a module or card to a maximum number of microprocessors and support circuits which may be incorporated onto the module due to the power consumption and physical packaging dimensions of the available microprocessors and their support circuits (memories, power regulators, bus interfaces, etc.).

As such, a given module design or configuration with a given number of processors operating at a certain execution speed will determine the total bandwidth and processing capability of the module for parallel and distributed processing applications such as image or signal processing. Thus, as a matter of practicality, it is determined whether a particular application can be ported to a specific module based upon these parameters. Any applications which cannot be successfully be ported to the module, usually due to requiring a higher processing bandwidth level than available on the module, are implemented elsewhere such as on mini-super computers.

As processor execution rates are increased, microprocessing system component integration is improved, and memory densities are improved, each successive multi-processor module is redesigned to incorporate a similar number of improved processors and support circuits. So, for example, a doubling of a processor speed may lead to the doubling of the processing bandwidth available on a particular module. This typically allows twice as many "copies" or instances of applications to be run on the new module than were previously executable by the older, lower bandwidth module. Further, the increase in processing bandwidth may allow a single module to run applications which were previously too demanding to be handled by a single, lower bandwidth module.

The architectural challenges of maximizing processor utilization, communication and organization on a multi-processor module remains constant, even though processor and their associated circuits and devices tend to increase in capability dramatically from year to year.

For many years, this led the military to design specialized multi-processor modules which were optimized for a particular application or class of applications, such as radar signal processing, infrared sensor image processing, or communications signal decoding. A module designed for one class of applications, such as a radar signal processing module, may not be suitable for use in another application, such as signal decoding, due to architecture optimizations for the one application which are detrimental to other applications.

In recent years, the military has adopted an approach of specifying and purchasing computing modules and platforms which are more general purpose in nature and useful for a wider array of applications in order to reduce the number of unique units being purchased. Under this approach, known as "Commercial-Off-The-Shelf" (COTS), the military may specify certain software applications to be developed or ported to these common module designs, thereby reducing their lifecycle costs of ownership of the module.

This has given rise to a new market within the military hardware suppliers industry, causing competition to develop and offer improved generalized multi-processor architectures which are capable of hosting a wide range of software applications. In order to develop an effective general hardware architecture for a multi-processor board for multiple applications, one first examines the common needs or nature of the array of applications. Most of these types of applications work on two-dimensional data. For example, in one application, the source data may represent a 2-D radar image, and in another application, it may represent 2-D magnetic resonance imaging. Thus, it is common to break the data set into portions for processing by each microprocessor. Take an image which is represented by an array of data consisting of 128 rows and 128 columns of samples. When a feature recognition application is ported to a quad processor module, each processor may be first assigned to process 32 rows of data, and then to process 32 columns of data. In signal processing parlance this is known as "corner turning". Corner turning is a characteristic of many algorithms and applications, and therefore is a common issue to be addressed in the interprocessor communications and memory arrangements for multi-processor boards and modules.

Figure 1:
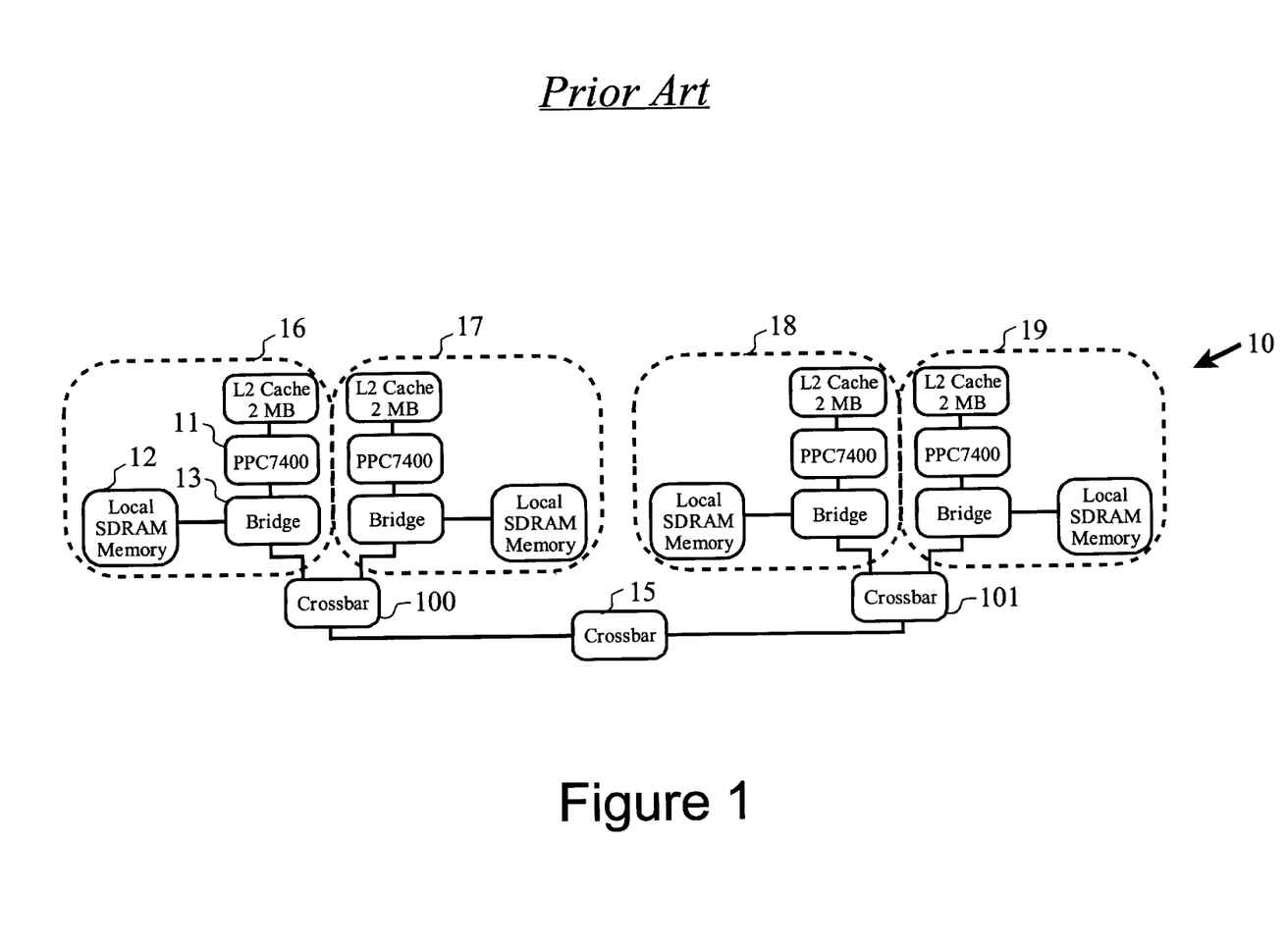
FIG. 1 shows an example of well-known distributed memory architectures for multiprocessor modules.
Figure 2:
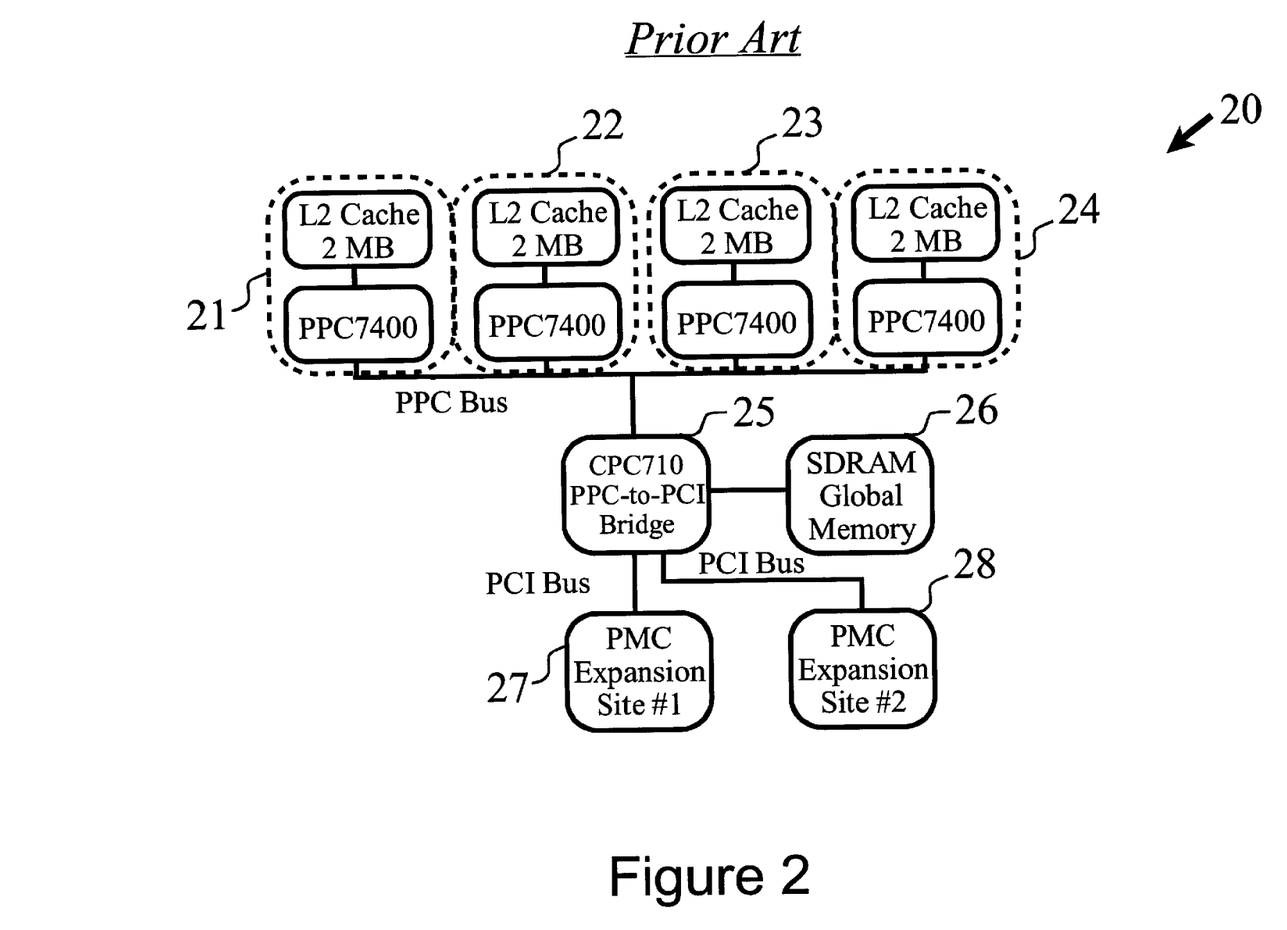
FIG. 2 illustrates an example of well-known shared memory architectures for multiprocessor modules.
Figure 3:
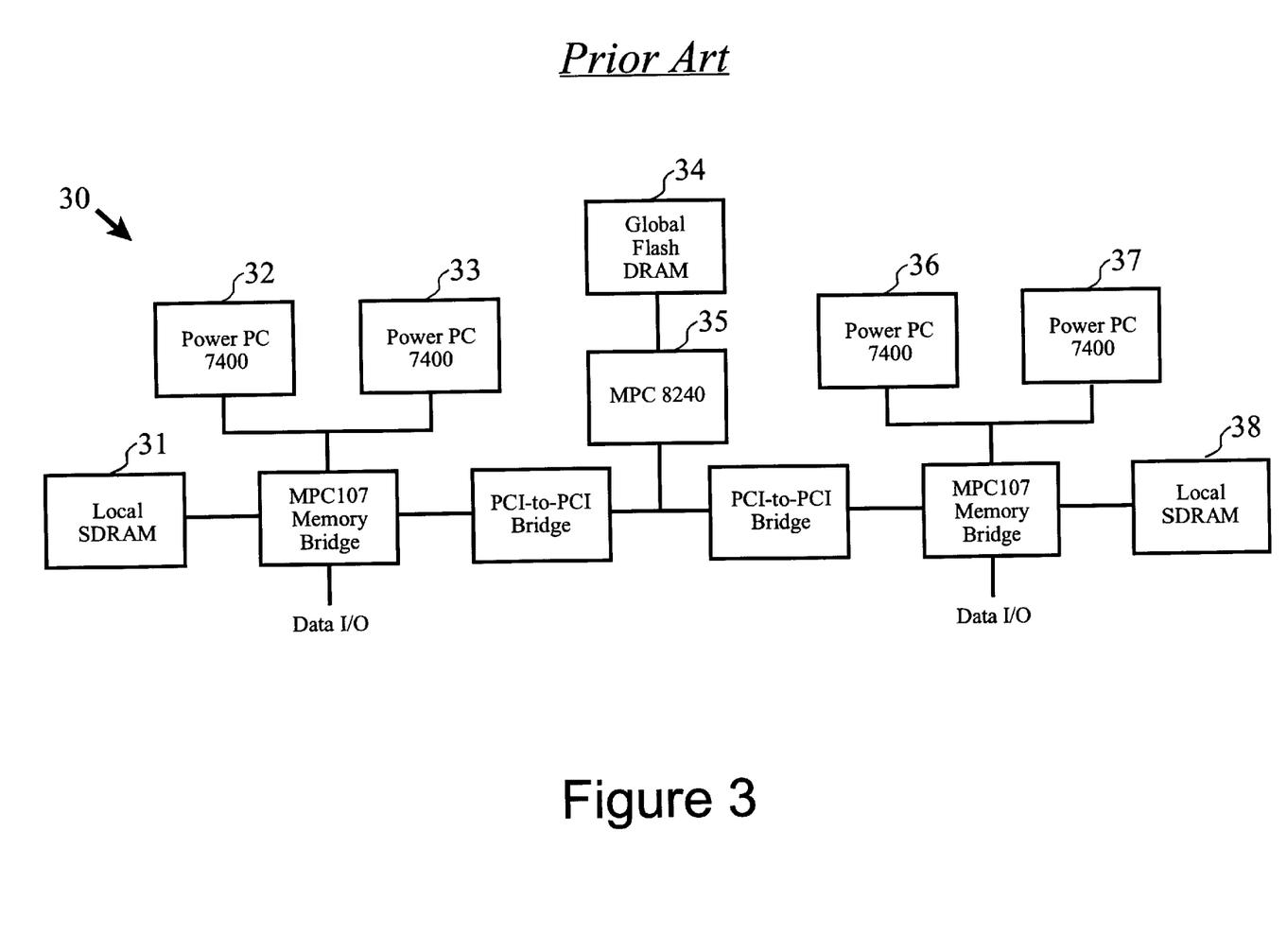
FIG. 3 sets forth an example of another well-known memory architecture for multiprocessor modules.

One microprocessor which has found widespread acceptance in the COTS market is the Motorola PowerPC [TM]. Available modules may contain one, two, or even four PowerPC processors and support circuits. The four-processor modules, or "quad PowerPC" modules, are of particular interest to many military clients as they represent a maximum processing bandwidth capability in a single module. There are three fundamentally different quad Power PC board or module architectures on the market, which are are illustrated in FIGS. 1 through 3. FIG. 1 illustrates an architecture known as the "distributed memory architecture", while both FIGS. 2 and 3 represent "dual memory" architectures. These architectures, though, could be employed well with other types and models of processors, inheriting the strengths and weaknesses of each architecture somewhat independently of the processor chosen for the module.

One advantage of distributed memory architectures as shown in FIG. 1 is that input data received at a central crossbar (15) can be "farmed out" via local crossbars (100 and 101) to multiple processors "cores" (16, 17, 18 and 19) that perform the processing of the data in parallel and simultaneously. Quad PowerPC cards such as this are offered by companies such as CSP Inc., Mercury Computer Systems Inc., and Sky Computers Inc.

For example, during the first phase of processing a hypothetical two-dimensional (2-D) data set of 128 rows by 128 columns shown in TABLE 1 on a distributed memory dual processor card, a first set of 32 rows (rows 0–31) of data may be sent to a first processor core (16), a second set of 32 rows (rows 32–63) of data would be sent to a second processor core (17), a third set of 32 rows (rows 64 to 95) of data to the third processor core (18), and the fourth set of 32 rows (rows 96 to 127) of data to the fourth processor core (19). Then, in preparation for a second phase of processing data by columns, a corner turning operation is performed in which the first processor core would receive data for the first 32 columns, the second processor core would receive the data for the second 32 columns, and so forth.

TABLE 1

Example 128 x 128 Data Array

| | | | | Column | | | |
|---|---|---|---|---|---|---|---|
| Row | 0 | 1 | 2 | 3 | 4 | ... | 126 | 127 |
| 0 | 0XFE | 0x19 | 0x46 | 0x72 | 0x7A | ... | 0x9C | 0x4B |
| 1 | 0x91 | 0x22 | 0x4A | 0xA4 | 0xF2 | ... | 0xBE | 0xB3 |
| 2 | 0x9A | 0x9C | 0x9A | 0x98 | 0x97 | ... | 0x43 | 0x44 |
| 4 | 0x00 | 0x00 | 0x81 | 0x8F | 0x8F | ... | 0x23 | 0x44 |
| . | . | . | . | . | . | | . | . |
| . | . | . | . | . | . | | . | . |
| . | . | . | . | . | . | | . | . |
| 126 | 0x34 | 0x3A | 0x36 | 0x35 | 0x45 | ... | 0xFB | 0xFA |
| 127 | 0x75 | 0x87 | 0x99 | 0xF0 | 0xFE | ... | 0xFF | 0xFA |

Regardless of the type of bus used to interconnect the processor cores, high speed parallel or serial, this architecture requires movement of significant data during a corner turning operation during which data that was initially needed for row processing by one processor core is transferred to another processor core for column processing. As such, the distributed memory architecture has a disadvantage with respect to efficiency of performing corner turning. Corner turning on multi-processor modules of this architecture type consumes processing bandwidth to move the data from one processor core to another, bandwidth which cannot be used for other computations such as processing the data to extract features or performing filtering algorithms.

Turning to the second architecture type commonly available in the COTS market, the advantage of shared memory architectures is that all data resides in one central memory, as illustrated in FIG. 2. COTS modules having architectures such as this are commonly available from Thales Computers Corp., DNA Computing Solutions Inc., and Synergy Microsystems. In this example, four processor cores (21, 22, 23, and 24) may operate on data stored in a global memory (26) such as via bridges (25) between processor-specific buses to a standard bus (PowerPC bus to Peripheral Component Interconnect "PCI" bus in this example).

The bridges (25) are responsible for arbitrating simultaneous attempts to access the global memory (26) from the processor cores. Additionally, common modules available today may provide expansion slots or daughterboard connectors such as PCI Mezzanine Connector (PMC) sites (27 and 28), which may also provide data access to the global memory (26). This architecture allows for "equal access" to the global data store, including the processor(s) which may be present on the expansion sites, and thus eases the decisions made during porting of large applications to specific processor cores because each "job" to be ported runs equally well on any of the processor cores.

Due to the centralized memory in this architecture, corner turning can be performed by addressing the shared memory (26) with a pointer that increments by one when processing row data, and increments by the number of data samples in a row when processing column data. This avoids the need to ship or move data from one processor core to another following initial row-data processing, and thereby eliminates wasted processor cycles moving that data.

However, the disadvantage of this arrangement is that all four processors must access data from the same shared memory, which often leads to a "memory bottleneck" that slows execution times due to some processor core requests being arbitrated, e.g. forced to wait, while another processor accesses the global memory. Thus, what was gained in eliminating the wasted processor cycles for moving data from core to core may be lost to wait states or polling loops caused by arbitration logic for accesses to shared memory.

Turning to the third architecture type commonly found in modules available on the COTS market, dual memory architectures are designed to utilize the best features of distributed and shared memory architectures, to facilitate fast processing and reduce corner turning overhead. As shown in FIG. 3, both memory schemes are adopted, providing the module with a global memory (34) accessible by all processor cores, and local memory (31, 38) for each processor or subset of processor cores. This addresses the arbitration losses in accessing a single shared global memory by allowing processor core to move or copy data which is needed for intense accesses from global memory to local memory. Some data which is not so intensely needed by a processor is left in the global memory, which reduces the overhead costs associated with corner turning. D 4 Systems offers a module having an architecture such as this.

In some respects, the architecture of FIG. 2 can be viewed as a dual memory architecture as well, and not strictly a shared memory architecture, as the local cache memory for each processor core may perform the functions of local memory shown in FIG. 1.

Most modem processors have increased their internal clock rate and computational capabilities per clock (or per cycle) faster than their ability to accept the data they need to process. In other words, most modern processors can now process data faster than they can read or write the data to be processed due to I/O speed limitations on busses and memory devices.

As a result, "operations/second" is no longer the chief concern when determining whether a particular processor or processor core is capable of executing a particular application. This concern has been replaced by data movement bandwidth as the driving consideration in measuring the performance of single processors, processor cores and arrays of processors. TABLE 2 summarizes data movement capabilities of several currently available distributed architecture boards, including the Race++ [TM] from Mercury Computer Systems Inc., the Sky Bolt II [TM] from Sky Computers Inc., and the Myranet 2841 [TM] from CSP Inc.

TABLE 2

Summary of Data Movement Capabilities
for Available Multi-processor Modules

| Movement Endpoints | Race ++ | SkyBolt II | Myranet |
|---|---|---|---|
| Processor to Local Mem | 1064 * 4 | 666 * 4 | 480 * 4 |
| Core to Core | 267 * 2 | 320 | 480 * 4 |
| Module I/O | 267 * 2 | 320 | 480 * 4 |

As can be seen from this comparison, each architecture has strong points and weak points. For example, the Race ++ [TM] and SkyBolt II [TM] architectures have nearly twice the performance for processor to local memory data movement than for core to core or module I/O data movement. For applications which utilize local memory heavily and do not need intense core-to-core movement or board I/O data flow, these may be adequate. But, this imbalance among data movement paths can eliminate these two boards from candidacy for many applications. On the contrary, the Myranet [TM] board has a good balance between the data movement paths, but at the cost of efficient local memory accesses. For example, the Myranet [TM] board appears to be approximately 50% faster transferring data in and out of the module and between cores than the SkyBolt II [TM], but 28% slower accessing local memory.

Therefore, there is a need in the art for a multiprocessor architecture for distributed and parallel processing of data which provides optimal data transfer performance between processors and their local memories, from processor to processor, and from processors to module inputs and outputs. In particular, there is a need in the art for this new arrangement to provide maximum performance when accessing local memory as well as nominal performance across other data transfer paths. Further, there is a need in the art for this new architecture to be useful and advantageous for realization with any high speed microprocessor family or combination of microprocessor models, and especially those which are commonly used for control or signal processing applications and which exhibit I/O data transfer constraints relative to processing bandwidth.

SUMMARY OF THE INVENTION

The new module and architecture provides a quad-processor arrangement having 6 communications paths, one direct communication path between each of the two possible pairs of processors. Each processor is provided with a local memory which can be accessed by the local processor as well as by the other processors via the communications paths. This allows for efficient data movement from one processor's local memory to another processor's local memory, such as commonly done during signal processing corner turning operations. The communications paths are controlled and interfaced to the processors through field programmable logic, which allows the board to be configured both statically and dynamically to optimize the data transfer characteristics of the module to match the requirements of the application software. In an additional advantage of the module architecture, the programmable logic may be configured so that the module emulates other existing board architectures in order to support legacy applications.

BRIEF DESCRIPTION OF THE DRAWINGS

The figures presented herein when taken in conjunction with the disclosure form a complete description of the invention.

DETAILED DESCRIPTION OF THE INVENTION

According to the preferred embodiment, the architecture of the invention is realized using four Motorola PowerPC [TM] G4 processors. However, it will be recognized by those skilled in the art that the architecture and arrangement of the invention is equally applicable and advantageous for realization with any high speed microprocessor family or combination of microprocessor models, and especially those which are commonly used for control or signal processing applications and which exhibit I/O data transfer constraints relative to processing bandwidth.

Therefore, the remainder of this disclosure is given in terms of implementation with the preferred microprocessor, but the data transfer paths disclosed herein may be equally well adopted between an arrangement of any set of processors.

Basic Communication Paths

Figure 4:
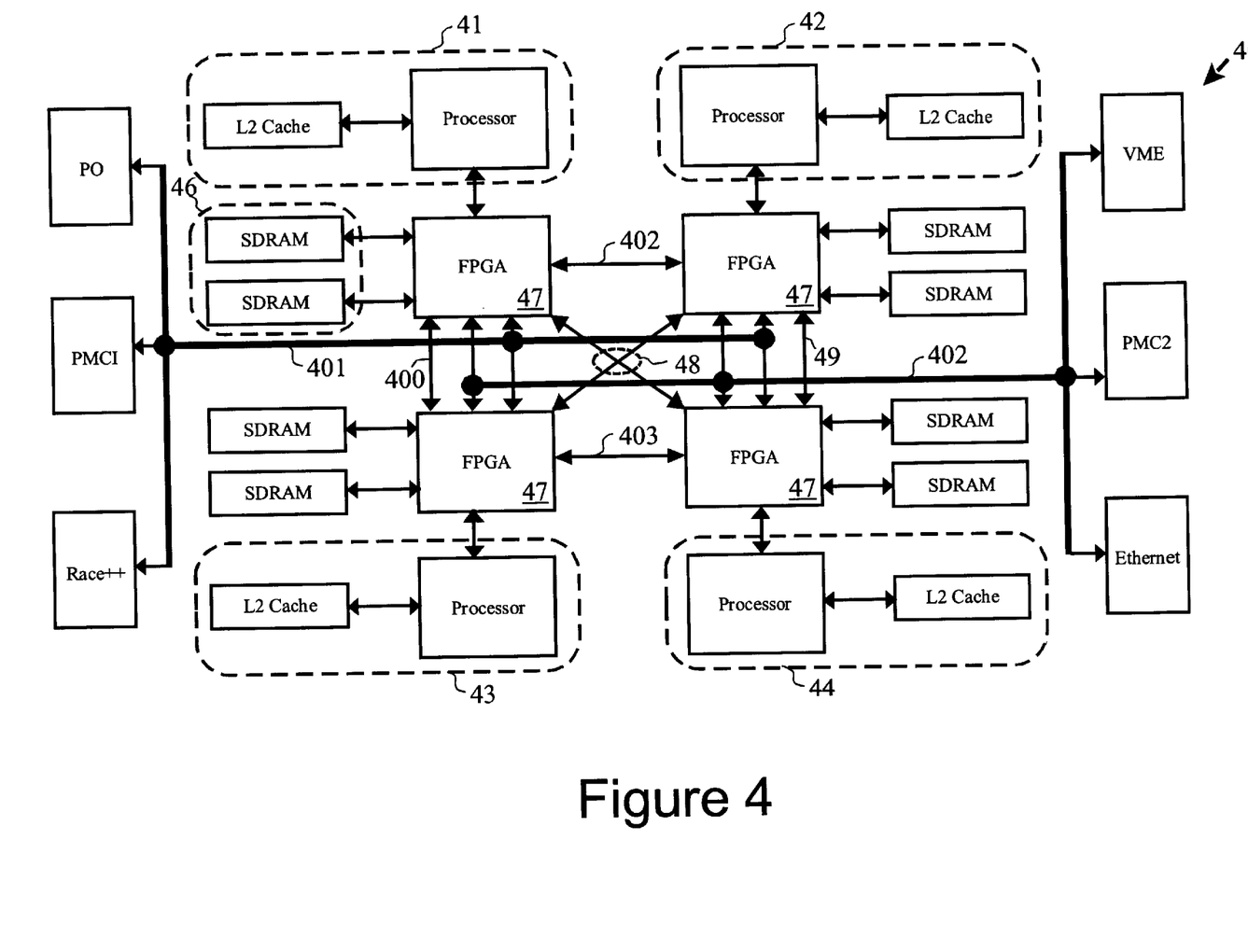
FIG. 4 illustrates the arrangement and architecture of the invention.

Turning to FIG. 4, the module architecture provides four processor nodes or cores (41, 42, 43, 44), each core containing a member of the Motorola PowerPC [TM] family and associated support circuitry. Each of the processors is interfaced to an external level 2 (L2) cache memory, as well as a programmed field programmable gate array (FPGA) device (47).

The nodes (41, 42, 43, and 44) are interconnected to the programmed FPGA devices (47) such that data transfer paths are established as follows:

(a) a "neighbor" path (402) between the first core (41) to the second core (42);

(b) a "neighbor" path (49) between the second core (42) to the fourth core (44);

(c) a "neighbor" path (403) between the fourth core (44) to the third core (43)

(d) a "neighbor" path (400) between the third core (43) to the first core (41);

(e) a "diagonal" path (48) between the first core (41) and the fourth core (44); and (f) a "diagonal" path (48) between the second core (42) and the third core (43).

In this new arrangement, every processor core is provided with a path to the other three processor cores. According to the preferred embodiment, these paths are each 32-bit parallel buss write-only paths. By defining the paths as write-only, arbitration circuitry and logic in the FGPA's is simplified and more efficient. Software processes which require data from the memory of another processor core may post or write a request into the memory of the other processor, of a task may be created in the other processor to explicitly move the data. Alternate embodiments may allow each path to be read-only, or read-write, as well as having alternate data widths (e.g. 8, 16, 64, 128-bits, etc.).

The six communication paths allow each processor in each core to have access to its own local memory, as well as to at least a portion of local memory of each of the other processors. This allows the tasks in each processor to move only the data that needs to be moved during corner turning, and to access data needed for processing from a local memory without arbitration for accesses to a global shared memory.

Also according to the preferred embodiment, board I/O paths (401 and 402) are provided between the FPGAs (47) and board I/O connectors such as a VME bus connector, PMC expansion sites, and or an Ethernet daughterboard connector.

Configurability of Path Interconnects

As the core path interconnects are implemented by buffering and control logic contained in the FGPA programs, and as the preferred embodiment utilizes a "hot programmable" FPGA such as the Xilinx XCV1600-8-FG1156 [TM], the module can be reconfigured at two critical times:

(a) upon initialization and loading of the software into the processor cores, such that the paths can be made, broken, and optimized for an initial task organization among the processors; and (b) during runtime on a real-time basis, such that paths may be dynamically created, broken or optimized to meet temporary demands of the processor module tasks and application.

This allows the module and architecture to be configured to "look like" any of the prior art architectures from the viewpoint of the software.

Local Memory Configuration

Each processor core is configured to have dual independent local memory banks (46), preferably comprised of 32 MB SDRAM each. A processor can access one of these banks at a given time, while the other bank is accessed by the module I/O paths (401) and (402). This allows another board or system to be loading the next set of data, perhaps from the VME bus, while each processor works on the previous set of data, where the next set of data is stored in one bank and the previous set of data is stored in another bank. This eliminates arbitration and contention for accessing the same memory devices, thereby allowing the processor to access the assigned local memory bank with maximized efficiency. Alternate embodiments may include different depths, widths, or sizes of memory, and/or different memory types (e.g. FlashROM, ROM, DRAM, SRAM, etc.).

Further according to the preferred embodiment, the programmed FPGAs (47) provide direct memory access (DMA) engines that can move data from the module I/O paths to memory bank without processor intervention, thus allowing processing and data movement to be performed in parallel and simultaneously. Alternate embodiments of the function of the FPGA's may not include such DMA capabilities, and may be implemented in alternate forms such as processor firmware, application specific integrated circuits (ASICs), or other suitable logic.

According to the preferred embodiment, the addressing for the two memory banks is defined such that the four "upper" memory banks, one for each processor, form one contiguous memory space, while the four "lower" memory banks, again one for each processor, form a second contiguous but independent memory space. While this is not required to achieve the fundamental advantages of the invention, it provides for a further increase in the efficiency with which software processes may access the local and remote memories. Alternate implementations of this memory arrangement and addressing scheme can, of course, be made without departing from the spirit and scope of the invention, including usage of more than two memory banks per processor, organizing one or more banks of memory into "pages", etc.

Path Interconnections and Configurations

The communication paths between the processor cores (or nodes) are controlled by the programmed FPGA devices (47) in the preferred embodiment. Each FPGA device provides full 64-bit data and 32-bit address connections to the two memory banks local to it. The three paths from local processor to non-local memory (e.g. other processor cores' local memories) are also 32-bits wide, and are write only, optimized for addressing the corner-turn processing function in two-dimensional signal processing. Alternate embodiments, of course, may use other types of logic such as ASICs or co-processors, and may employ various data and address bus widths.

Module I/O

In the preferred embodiment, the module provides two 64-bit, 66 MHz PCI-based interconnection interfaces (401 and 402), interfaced to the following items:

(a) first PCI bus (401) to PMC1 site, Race ++ or P0 to all processor cores; and (b) second PCI bus (402) to PMC2 site, Ethernet or VME connector to all processor cores.

As previously discussed regarding the preferred embodiment, the programmed FPGAs provide DMA engines for moving data in and out of the various local memories, from and to the PCI module busses. Alternate module I/O interfaces may be incorporated into the invention, including but not limited to alternate bus interfaces, expansion slot or connector interfaces, serial communications, etc.

Enhanced Module Functional Features

The multiple parallel interconnections between processor cores allow the module to be configured to emulate various functions inherently advantageous to real-time processing, including:

(a) Ping-Pong Memory Processing, which is a technique commonly used for real-time applications to isolate processing operations from data I/O operations, and to isolate I/O data rates which may be different than processing rates.

(b) "Free" corner turning, which is required by nearly all applications that start with a 2-D array of data. Typically, the processing of that 2-D array of data starts with processing along the rows of the array, followed by processing down the columns of the data array. To make efficient use of the power of the processors, the data to be first processed in the row dimension should all be located in the local memory of the processor(s) executing that work. Similarly, to make efficient use of the processors, the data to be subsequently processed in the column dimension should all be located in the local memory of the processor(s) performing subsequent is or second phase of processing. In general, these are different sets of data and different processors. Therefore, rearranging the data (e.g. corner turning) must occur between the two phases of processing. The new module architecture of the invention allows output data from the first stage of processing to be directly written to the local memory of a second processor, where it is needed for the second phase of processing along columns. This technique avoids explicit movement of the data for corner turning entirely. Alternatively, by employing the FPGA DMA engines, this data or any other data in one processor's local memory can be moved to the local memory of another processor with no processor cycles wasted or used for the data movement. This latter approach may be useful in some applications where data is to be "broadcast" or copied to multiple destinations, as well. In either case, the data movement operation is a "free" operation on the module.

(c) Multiple Architecture Configurations. There are two reasons it is useful to be able to configure the module's data paths to be organized like its lower performance counterparts. First, this allows applications to be easily moved from that counterpart board to the module first when configured similar to the counterpart. Later, the application software can be optimized for the higher performance capabilities of the module as a second, lower risk step. The second reason is that certain portions of an application may work better in one architecture than another. Dynamic reconfigurability of the module allows the application software to take advantage of that peculiarity of portions of the application to further optimize performance. As such, the module can be statically or dynamically configured through FPGA programs to resemble and perform like a pure distributed architecture, pure shared memory architecture, or hybrids of shared and distributed.

According to our analysis, the module meets or exceeds the data path characteristics of the modules presented and compared in the BACKGROUND OF THE INVENTION. The module attains a processor-to-local memory data rate of 1064 million accesses per second for each of the four processors, a core-to-core data rate of 400 million accesses per second on each of 6 data paths, and a data rate on the module I/O of 528 million accesses on each of module I/O busses.

As the advantage of the architecture of the module and it's ability to perform "free" corner turning operations lies in the data path configurations and organization, many alternate embodiments using alternate busses, communication schemes, processors, and circuit implementations can be made without departing from the invention's architecture. Such alternate implementations may result in improved performance, costs and/or reliability, to suit alternate specific requirements.

The preferred embodiment described herein, and compared by analysis to performance of existing designs, is suited for a particular purpose. It is within the skill of the art to adapt the preferred embodiment to meet alternate requirements without departing from the scope of the invention.

As certain details of the preferred embodiment have been described, and particular examples presented for illustration, it will be recognized by those skilled in the art that many substitutions and variations may be made from the disclosed embodiments and details without departing from the spirit and scope of the invention. For example, the general 6-path communications arrangement may be adopted with any of a number of microprocessors, and the logic of the FPGA's may be incorporated into the circuitry of the microprocessor. Therefore, the scope of the invention should be determined by the following claims.

What is claimed is:

1. A multi-processor system for signal processing comprising:
    a plurality of processor cores, each processor core having a local processor, at least two shareable local memory banks, a communications bus interface, and a set of buffers disposed between said local processor, communications bus, and local memory banks which provides a cacheless data path between said local memory banks and said communications bus and said local processor;
    a plurality of point-to-point communication busses disposed between each of said communications bus interfaces in pairs such that each processor core may directly access at least one bank of local memory for another processor core; and
    control logic associated with said local memory banks for controlling said sets of buffers such that, at any given time and selectable under software control by one or more of said processors, each local processor is provided uncontended and unarbitrated access to at least one local memory bank within its processor core while uncontended and unarbitrated access to another local memory bank is allowed by another processor of another processor core via one of said point-to-point communication busses, thereby preventing simultaneous attempts by a local processor to access the same memory bank as a processor from another processor core and avoiding contention and arbitration delays in accessing data in said memory banks.

2. The multi-processor system as set forth in claim 1 wherein said communications bus interfaces comprise programmable logic such that each communications bus interface may be configured to make, break or optimize a communications bus.

3. The multi-processor system as set forth in claim 1 wherein said communications bus interfaces comprise 32-bit data busses.

4. The multi-processor system as set forth in claim 1 wherein said communications bus interfaces comprise write-only data busses.

5. The multi-processor system as set forth in claim 1 wherein said communications bus interfaces comprise read-only data busses.

6. The multi-processor system as set forth in claim 1 further comprising a multi-point module I/O bus disposed between each said communications bus interfaces and a module I/O interface.

7. The multi-processor system as set forth in claim 2 wherein said programmable logic comprises hot programmable logic such that each communications bus interface may be dynamically reconfigured by a processor.

8. The multi-processor system as set forth in claim 6 wherein said multi-point module I/O bus comprises a VME interface.

9. The multi-processor system as set forth in claim 6 wherein said multi-point module I/O bus comprises and PMC site interface.

10. The multi-processor system as set forth in claim 6 wherein said multi-point module I/O bus comprises an Ethernet module interface.

11. The multi-processor system as set forth in claim 6 wherein said multi-point module I/O bus comprises a Race++ interface.

* * * * *

UNITED STATES PATENT AND TRADEMARK OFFICE
CERTIFICATE OF CORRECTION

PATENT NO. : 6,757,761 B1
DATED : June 29, 2004
INVENTOR(S) : Smith, Winthrop W.

It is certified that error appears in the above-identified patent and that said Letters Patent is hereby corrected as shown below:

Column 10,
Line 35, insert the following claim:

-- 3. The multi-processor system as set forth in Claim 2 wherein said programmable logic comprises hot programmable logic such that each communication bus interface may be dynamically reconfigured by a processor.
Renumber "claim 3" to -- claim 4 --;
Renumber "claim 4" to -- claim 5 --;
Renumber "claim 5" to -- claim 6 --;
Renumber "claim 6" to -- claim 7 --;
Renumber "claim 7" to -- claim 8 --;
Renumber "claim 8" to -- claim 9 --;
Renumber "claim 9" to -- claim 10 --;
Renumber "claim 10" to -- claim 11 --;
Renumber "claim 11" to -- claim 12 --.

Signed and Sealed this

Twenty-fourth Day of August, 2004

JON W. DUDAS
*Director of the United States Patent and Trademark Office*